United States Patent [19]

Lysson et al.

[11] Patent Number: 5,545,246
[45] Date of Patent: Aug. 13, 1996

[54] METHOD AND DEVICE FOR MANUFACTURING AN OPTICAL FIBER

[75] Inventors: Hans-Jürgen Lysson, Korschenbroich; Frank Lisse, Köln; Manuela Hahn, Monchen-Gladbach; Hans-Detlef Leppert, Mönchengladbach, all of Germany; Philippe Darbon, Saint Michel sur Orge, France

[73] Assignee: Kabel Rheydt Aktiengesellschaft, Monchen-Gladbach, Germany

[21] Appl. No.: 336,190

[22] Filed: Nov. 8, 1994

[30]     Foreign Application Priority Data

Nov. 16, 1993 [DE] Germany ................. 43 39 077.3

[51] Int. Cl.⁶ .................. C03B 37/025; C03B 37/02
[52] U.S. Cl. ................... 65/435; 65/477; 65/507; 65/537; 65/538
[58] Field of Search ............ 65/424, 435, 477, 65/478, 481, 507, 513, 530, 533, 537, 538, 385, 475

[56]     References Cited

U.S. PATENT DOCUMENTS

| Re. 28,029 | 6/1974 | Keck et al. | 65/3 |
|---|---|---|---|
| 4,030,901 | 6/1977 | Kaiser | 65/2 |
| 4,040,807 | 8/1977 | Midwinter et al. | 65/3 |
| 4,101,300 | 7/1978 | Imoto et al. | 65/530 X |
| 4,249,925 | 2/1981 | Kawashima et al. | 65/3 |
| 4,396,409 | 8/1983 | Bailey et al. | 65/3.11 |
| 4,427,717 | 1/1984 | Gauthier | 427/163 |
| 4,437,870 | 3/1984 | Miller | 65/12 |
| 4,440,556 | 4/1984 | Oh et al. | 65/2 |
| 4,514,205 | 4/1985 | Darcangelo et al. | 65/12 |
| 4,531,959 | 7/1985 | Kar et al. | 65/3.11 |
| 4,608,276 | 8/1986 | Lamb et al. | 427/163 |
| 4,659,354 | 4/1987 | Roba | 65/3.12 |
| 4,664,689 | 5/1987 | Davis | 65/3.11 |
| 4,673,427 | 6/1987 | Van Der Giesen et al. | 65/2 |
| 4,761,168 | 8/1988 | Blyler, Jr. et al. | 65/3.1 |
| 4,913,715 | 4/1990 | Jochem et al. | 65/3.11 |
| 4,966,615 | 10/1990 | Linden et al. | 65/12 |
| 4,988,374 | 1/1991 | Harding et al. | 65/435 |
| 5,059,229 | 10/1991 | Blankenship et al. | 65/424 |
| 5,160,359 | 11/1992 | Strackenbrock et al. | 65/3.12 |
| 5,281,247 | 1/1994 | Aikawa et al. | 65/530 X |
| 5,284,499 | 2/1994 | Harvey et al. | 65/537 X |

FOREIGN PATENT DOCUMENTS

| 0079186 | 5/1983 | European Pat. Off. . | |
| 1174133 | 8/1986 | Japan . | |
| 1-275443 | 11/1989 | Japan | 65/435 |
| 2-6346 | 1/1990 | Japan | 65/435 |
| 5-208840 | 8/1993 | Japan | 65/435 |

OTHER PUBLICATIONS

High-Speed Optical Fiber Drawing by Chida, Kimura and Wagatsuma, ECL, vol. 32, No. 3, 1984, pp. 425–431.

Primary Examiner—David A. Simmons
Assistant Examiner—M. Curtis Mayes
Attorney, Agent, or Firm—Ware, Fressola, Van Der Sluys & Adolphson

[57] ABSTRACT

A method for manufacturing an optical fiber (11), wherein the fiber (11) is drawn from one end of a preform (9) which is heated to above the glass softening temperature. The preform (9) is surrounded by a protective gas (14) whose flow direction corresponds to the fiber drawing direction. The flow of the gas surrounding the preform (9) in the drawing area (10) is stabilized by an additional flushing gas (16).

21 Claims, 2 Drawing Sheets

1

METHOD AND DEVICE FOR MANUFACTURING AN OPTICAL FIBER

BACKGROUND OF THE INVENTION

1. Field of the Invention

The present invention concerns optical fibers and, more particularly, a method for manufacturing an optical fiber, whereby the fiber is drawn from one end of a preform heated to the glass softening temperature, while a gas flows around the preform and its flow direction corresponds to the fiber drawing direction.

2. Description of the Prior Art

The direct manufacture of an optical fiber having the required fiber profile from different types of glass is not possible because of the small outside dimensions of the optical fiber. The manufacture of an optical fiber is therefore based on a preform with a diameter in the centimeter range, which can be produced in several different ways, e.g., with multimode-gradients or single mode fibers, depending on the type of optical fiber desired. One method of producing a preform is the chemical vapor deposition method (CVD-method) which involves applying a core glass material to the inner surfaces of a quartz glass tube by chemical deposition from the vapor phase of the core glass material onto the inside surfaces of the quartz glass tube, which is subsequently collapsed into a preform. The Outside Vapor Deposition method (OVD-method) involves the outside coating of a glass core with a glass material by deposition from the vapor phase of the glass material on the outside of the glass core. The Vapor Axial Deposition method (VAD-method) provides for the axial coating of a glass core with a glass material by deposition from the vapor phase of the glass material axially along the glass core.

Glass is an amorphous material, which can be brought to a low viscosity condition by heating. With the quartz glass normally used today to manufacture fibers, a noticeable softening of the glass occurs at a glass softening temperature of about 1900 to 2200 K. Glass softening at the glass softening temperature is used to draw a preform into a thin glass fiber. To that end, the preform is heated in a drawing oven, which can be a graphite resistance oven, e.g., wherein a heating element under protective gas is brought to the glass softening temperature by pulsating direct or alternating current, or an induction oven, in which a tube, e.g., made of zirconium oxide or graphite, is brought to the glass softening temperature by an electromagnetic field.

The chimney effect in the circular or tube-shaped internal space of such known drawing ovens produces an air or gas flow through the inside of the oven when at the operating temperatures required for fiber manufacture. After the preform is introduced into the oven, the local conditions inside the oven lead to turbulence in this air or gas flow, which in turn has detrimental effects on the fiber damping and the fiber strength. Such turbulence still exists when a protective gas is blown from the top through the inside of the drawing oven. The turbulence of the protective gas results from the temperature of the protective gas increasing from an upper inlet area of the oven to about the middle of a drawing area, i.e., the production area of the oven containing the heated end of the preform where the fiber is pulled or drawn, and decreasing again in an outlet area. At the same time, an increase in the cross section of the area adjacent to the heated end of the preform takes place in the drawing direction of the fiber in an annular gap between the preform surface and the internal oven wall. The increased cross-sectional area of the annular gap results from the reduced cross-section of the preform as it is drawn down into a fiber. The increased cross-sectional area of the annular gap causes a change in the thus far mostly laminar flow of the gas being introduced from above, resulting in a turbulent flow due to the decrease of the flow speed, precisely in this sensitive fiber drawing area. Particles which may be carried in with the mostly laminar flow are deposited on the heated end of the preform or on the fiber being pulled from it. Such particles are the cause of later fiber breakage or possible defects in the glass surface or the fiber surface.

SUMMARY OF THE INVENTION

An object of the invention is the prevention of gas turbulence inside a drawing oven, or to limit the influence of gas turbulence to an insignificant effect on the quality of an optical fiber which is drawn from a preform in the drawing oven.

It has been found that the foregoing objects can be readily attained by stabilizing the flow of a protective gas surrounding the preform in the drawing area of the drawing oven with an additional flushing gas. This additional flushing gas, which is guided into the drawing area, prevents a separation of the basically laminar flow of the protective gas introduced into the oven space from above as it flows down in the annular gap between the external preform surface and the internal oven wall, in the free cross-section which is steadily increasing from the heated end of the preform down to the fiber cross section.

It has proven effective for carrying out the invention to allow the additional flushing gas to impact the protective gas surrounding the preform crosswise to its flow direction. Another advantageous possibility is to let the additional flushing gas have an axial component when flowing into the drawing area, where the axial component becomes zero in the extreme case.

In one embodiment of the invention, the additional flushing gas is supplied into the oven space in the opposite direction to the flow direction of the protective gas surrounding the preform. The additional flushing gas is first supplied in the opposite direction of the gas surrounding the preform, i.e., in the area where the fiber is being drawn from the heated lower end of the preform, and then the flow direction of the flushing gas is turned around into the direction in which the fiber is drawn.

According to the invention, the additional flushing gas results in a stabilization of the protective gas that is introduced into the oven space in the drawing direction. The flow speed of the additional flushing gas must therefore be selected so that the stabilization effect is achieved, but no additional disturbing impulse is exerted on the flowing gas. For this reason, the flow speed of the additional flushing gas can at most be equal to the flow speed of the protective gas surrounding the preform in the drawing direction.

To carry out the method of the invention, a vertical drawing oven is used, having a heated cylindrical wall surrounding the preform. To heat the glass preform used for drawing optical fibers, induction ovens are known, which comprise an internal heating tube made of an electrically conductive high-temperature resistant material, e.g., graphite, for containing the glass preform, heat insulation on the outside of the internal heating tube, and an outer glass tube surrounded by an induction coil. A protective gas flow is introduced into the oven space from above. In accordance with the invention, the oven space contains additional gas injection nozzles in the drawing area of the preform, preferably distributed around the circumference, for the introduction of an additional flushing gas flow, to achieve a laminar flow of the protective gases in the oven space that receives the preform and the drawn fibers.

In an advantageous variation of the invention, a guide tube, which concentrically surrounds the already drawn fiber, protrudes into the described drawing oven from below. The external surface of the guide tube forms an annular gap with the surrounding wall of the drawing oven, and the additional flushing gas is provided in the annular gap. The guide tube has the further effect of providing additional tempering of the just drawn fiber before it leaves the inner oven space through the outlet end of the drawing oven.

Since it is important for the invention to stabilize the gas flow of protective gases in the drawing area, as explained earlier, the axial length of the guide tube is selected so that it reaches into the drawing area. Since the guide tube is also exposed to the high-temperature area, it is an advantage if the chosen guide tube material is the same as that of the surrounding tube wall, for example graphite.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
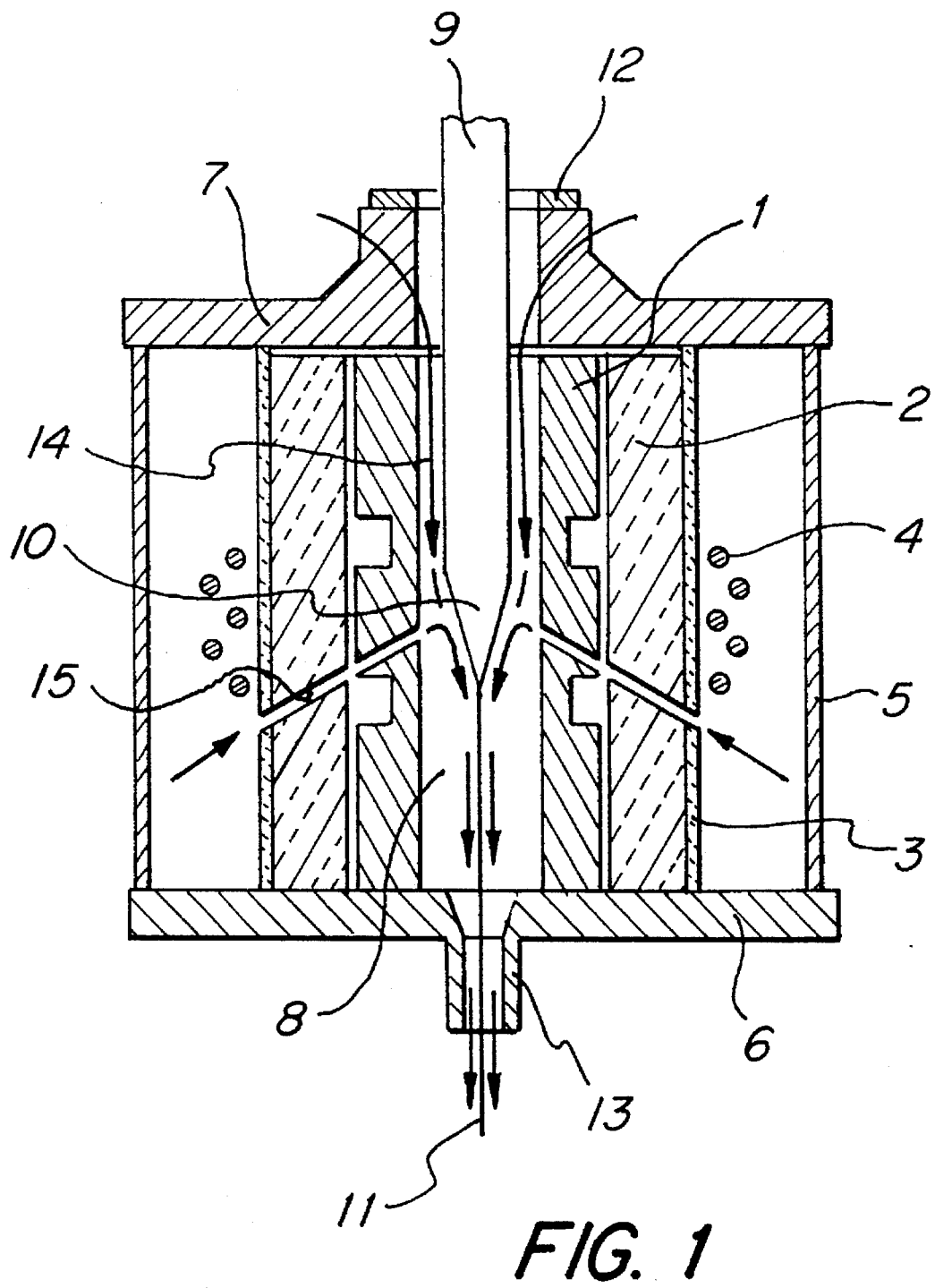
FIG. 1 is a cross-sectional view of a drawing oven having stabilized flow of protective gases in accordance with the invention.

The drawing oven illustrated in FIG. 1 comprises a cylindrical "susceptor" 1, an outwardly adjacent layer of insulation 2 which is also cylindrical, and a surrounding quartz tube 3. In the illustrated configuration, the susceptor 1 and the insulation 2 are made of graphite. The susceptor, which acts as a heating tube, can also be made of zirconium oxide stabilized with yttrium. The heating tube 1 can be viewed as a short-circuited winding of an induction coil 4. A concentric external wall 5 closes off the drawing oven on the outside, in conjunction with a flange-like bottom plate 6 and an oven cover 7.

A preform 9 is introduced into the oven space 8 through the oven cover 7, from which, as illustrated, the fiber 11 is drawn from the heated lower end of the preform which is referred to as a "root" or "draw down" portion 10 of the preform. The draw down portion 10 has an inverted dome or onion shape. A seal 12 seals the oven space 8 in the cover area, and the bottom plate 6 terminates in a flange 13. As indicated by arrows 14, a protective gas, for example argon, nitrogen or similar, is injected through not illustrated nozzles in the oven cover 7. The protective gas has a laminar flow and flows around the preform 9 in the drawing direction of the fiber 11. In the high-temperature area of the oven, which is the area where the draw down portion 10 is formed by drawing the fiber 11, the temperature of the protective gas increases, at the same time the open cross section of the oven also increases, due to the reduction of the preform cross section in the drawing area, resulting in turbulence of the protective gas. Such turbulence in this area during operation cannot be tolerated since this turbulence is connected to the danger of glass surface contamination. The invention provides for the introduction of an additional flushing gas in this area, to prevent the gas flow 14 of the protective gas surrounding the preform from lifting, and thereby stabilizing it. To achieve this, additional gas guidance channels 15 are provided, which are advantageously distributed around the circumference of the preform 9 and radially introduce the flushing gas into the oven space 8.

To prevent turbulence caused by the flushing gas, the gas flow speed of the flushing gas may be limited to a speed less than or equal to the gas flow speed of the protective gas.

Figure 2:
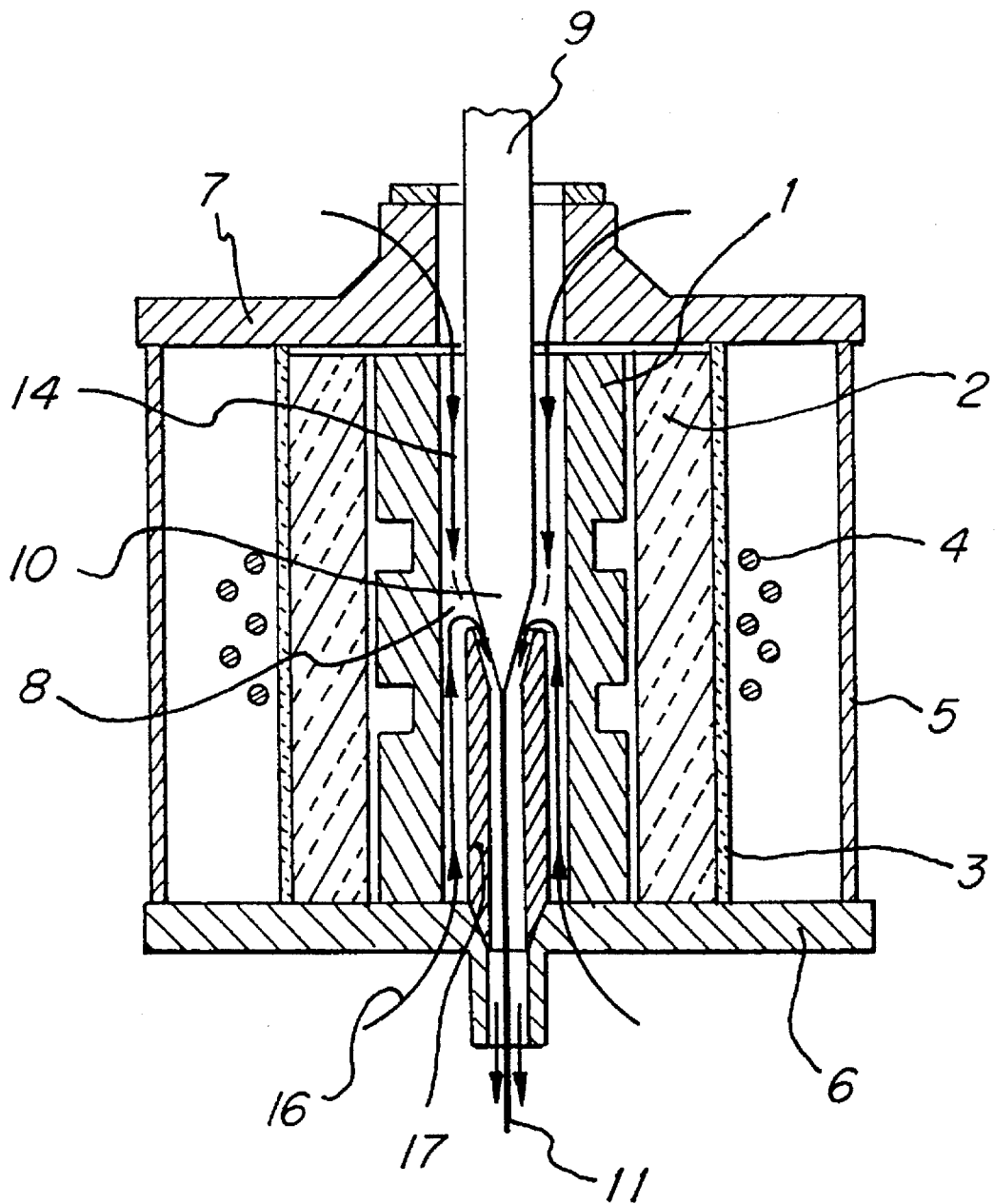
FIG. 2 is a cross-sectional view of an alternative embodiment of the drawing oven in accordance with the invention.

Another advantageous configuration for carrying out the method of the invention is illustrated in FIG. 2. The construction of the oven itself essentially corresponds to the configuration depicted in FIG. 1. The susceptor 1, is surrounded by the adjacent, concentric layer of insulation 2 which is surrounded by the surrounding quartz glass tube 3. The induction coil 4 for heating the susceptor 1, which functions as the heating tube, is contained within the concentric external wall 5. The bottom plate 6 and the oven cover 7 of the drawing oven are further developed in accordance with this embodiment of the invention.

In this embodiment as well, a preform 9 is introduced from above into the oven space 8, where the fiber 11 is drawn from the drawing dome 10 after the glass material of the preform 9 has been brought to the softened flow condition. To prevent the protective gas 14, which is also introduced from above through not illustrated guide nozzles, from changing from the laminar flow into a turbulent flow in the drawing area, an additional flushing gas 16 is introduced from below in the opposite direction of the protective gas flow 14. The additional flushing gas 16 fills the oven space 8 created by the reduction of the preform's cross section in the area of the draw down portion 10, thereby stabilizing the protective gas flow in this area.

A particularly useful method of introducing the flushing gas 16 is shown in FIG. 2, wherein an additional guide tube 17, made of graphite for example, is introduced into the oven space 8 from below. The additional guide tube 17 reaches into the drawing area, i.e. into the high-temperature area of the oven. At the upper end of the additional guide tube 17, the direction of the additional flushing gas 16 is reversed by the protective gas 14 coming from above, and is guided downwards on the inside of the guide tube 17, where it practically encloses the fiber 11. The combination of the protective gas 14 and the additional flushing gas 16 fills the enlarged open cross-section of the oven space 8 in the drawing area, thus preventing the creation of turbulence.

The invention is not restricted to the illustrated configuration examples, insofar as other oven configurations may also be used. It will be understood by those skilled in the art that the invention can be used for the indicated purpose in any drawing oven in which protective or flushing gases are introduced into the inside of the oven space.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A method for manufacturing an optical fiber comprising the steps of:

providing a preform;

heating an end of said preform to above a glass softening temperature;

drawing an optical fiber in a fiber drawing direction from said heated end of said preform, wherein a cross-section of said preform decreases in a drawing area where said optical fiber is drawn from said heated end of said preform;

providing a protective gas flow around said preform, said protective gas flow having a laminar flow around said preform in a protective gas flow direction corresponding to said fiber drawing direction; and stabilizing said laminar flow of said protective gas flow in said drawing area with an additional flushing gas flow, wherein said additional flushing gas flow is introduced in said drawing area.

2. A method as claimed in claim 1, wherein said additional flushing gas flow impacts said protective gas in said drawing area crosswise to said protective gas flow direction.

3. A method as claimed in claim 2, wherein said additional flushing gas flow is chosen from a group consisting of air, nitrogen and an inert gas.

4. A method as claimed in claim 2, wherein a gas flow speed of said additional flushing gas flow is less than or equal to a gas flow speed of said protective gas flow.

5. A method as claimed in claim 1, wherein said additional flushing gas flow has a flushing gas flow direction opposite to said protective gas flow direction.

6. A method as claimed in claim 5, wherein said additional flushing gas flow is chosen from a group consisting of air, nitrogen and an inert gas.

7. A method as claimed in claim 5, wherein a gas flow speed of said additional flushing gas flow is less than or equal to a gas flow speed of said protective gas flow.

8. A method as claimed in claim 1, wherein said additional flushing gas flow is first guided in an additional flushing gas flow direction opposite to said protective gas flow direction, and then said additional flushing gas flow direction is reversed into said fiber drawing direction in said drawing area.

9. A method as claimed in claim 8, wherein said additional flushing gas flow is chosen from a group consisting of air, nitrogen and an inert gas.

10. A method as claimed in claim 8, wherein a gas flow speed of said additional flushing gas flow is less than or equal to a gas flow speed of said protective gas flow.

11. A device for manufacturing an optical fiber from a preform, comprising:

a vertically oriented drawing oven having a cylindrical heating tube for surrounding the preform and heating an end of the preform to above a glass softening temperature for drawing an optical fiber in a fiber drawing direction from the heated end of the preform, said drawing oven having a drawing area where said optical fiber is drawn from the heated end of the preform, and wherein a cross-section of the preform decreases in said drawing area;

means for providing a protective gas flow around the preform, said protective gas flow having a laminar flow around the preform in a protective gas flow direction corresponding to said fiber drawing direction; and means for providing an additional flushing gas flow in said drawing area for stabilizing said laminar flow of said protective gas flow in said drawing area.

12. A device as claimed in claim 11, further comprising a guide tube protruding into said drawing oven from below and extending into said drawing area, said guide tube concentrically surrounding said optical fiber drawn from the preform, said guide tube being concentrically positioned with respect to said heating tube, and said additional flushing gas flow being provided in an annular gap formed in said drawing oven by an external surface of said guide tube and an internal surface of said heating tube.

13. A device as claimed in claim 12, wherein said additional flushing gas flow is first guided in a flushing gas flow direction opposite to the gas flow direction of said protective gas, and then said flushing gas flow direction is reversed at an end of said guide tube in said drawing area into said fiber drawing direction.

14. A device as claimed in claim 12, wherein said additional flushing gas flow is chosen from a group consisting of air, nitrogen and an inert gas.

15. A device as claimed in claim 12, wherein a gas flow speed of said additional flushing gas flow is less than or equal to a gas flow speed of said protective gas flow.

16. A device as claimed in claim 12, wherein said guide tube is made of a high-temperature resistant material.

17. A device as claimed in claim 16, wherein said heating tube and said guide tube are made of graphite.

18. A device as claimed in claim 11, wherein said means for providing additional flushing gas flow are gas injection nozzles formed in said heating tube, said gas injection nozzles being distributed around the circumference of said heating tube for providing said additional flushing gas flow in said drawing area.

19. A device as claimed in claim 18, wherein said gas flow nozzles direct additional flushing gas flow to impact said protective gas flow crosswise to said protective gas flow direction.

20. A device as claimed in claim 18, wherein said additional flushing gas flow is chosen from a group consisting of air, nitrogen and an inert gas.

21. A device as claimed in claim 18, wherein a gas flow speed of said additional flushing gas flow is less than or equal to a gas flow speed of said protective gas flow.

* * * * *